United States Patent [19]

Barr

[11] Patent Number: 4,519,712
[45] Date of Patent: May 28, 1985

[54] POSITIVE DISPLACEMENT PUMP ASSEMBLY

[76] Inventor: Robert A. Barr, P.O. Box 4476, Virginia Beach, Va. 23454

[21] Appl. No.: 648,040

[22] Filed: Sep. 6, 1984

[51] Int. Cl.$^3$ .............................................. B29B 1/06
[52] U.S. Cl. ...................................... 366/77; 366/88; 366/89; 366/323
[58] Field of Search ...................... 366/69, 77, 79, 87, 366/88, 89, 184, 190, 194–196, 318, 323; 425/207–209, 376 R; 418/48

[56] References Cited

U.S. PATENT DOCUMENTS

| | | | |
|---|---|---|---|
| 3,698,541 | 10/1972 | Barr | 366/88 X |
| 4,079,463 | 3/1978 | Miller | 366/323 X |
| 4,341,474 | 7/1982 | Wheeler, Jr. et al. | 366/323 X |
| 4,405,239 | 9/1983 | Chung et al. | 366/89 |
| 4,443,165 | 4/1984 | Chanton | 418/18 |

Primary Examiner—Timothy F. Simone
Attorney, Agent, or Firm—Mason, Fenwick & Lawrence

[57] ABSTRACT

A screw extruder and positive displacement pump assembly for plasticating or melting solid plastic material or the like, including an extruder screw member in an elongated cylindrical barrel having an upstream end and a downstream or discharge end, the screw being rotatably housed in portions of the barrel adjacent the upstream end. The screw has a helical thread of plural turns integral with the core of the screw having a minimum clearance to the barrel for feeding the plastic material along the screw from its feed end to its discharge end. A positive displacement Moineau type pump is located in the barrel near the outlet end having a stator member and a rotor member rotatable therein coupled to and driven by the screw, the stator and rotor members having confronting surfaces of developed helical contours providing helical threads of wide rounded form with a lesser number of threads on the rotor providing a series of pumping pockets which progress longitudinally through the pump section.

8 Claims, 6 Drawing Figures

POSITIVE DISPLACEMENT PUMP ASSEMBLY

BACKGROUND AND OBJECTS OF THE INVENTION

The present invention relates in general to pump structures, and more particularly to a positive displacement pump structure particularly suitable for association with a single screw type extruder for extruding plastics and the like.

Employment of a screw or the like in an extruder for working wide ranges of solid plastic material into a substantially homogeneous molten state suitable for formation into any desired shape by extrusion or injection into a die or mold has become well known.

Extrusion, injection molding or blow molding with a single screw extruder includes feeding the solid polymeric or plastic material in pellet, chip, powder, or flake form to the feed end of the extruder through a hopper mounted on an opening of the heated barrel in which a screw is rotatably mounted. The screw has at least one helical thread with a minimum clearance to the barrel, integrally formed on the core to create a helical channel, along which the plastic material is moved downstream from the feed end to the discharge end by forces exerted by the rotation of the screw. The solid plastic material fed into the screw channel is compacted into a solid plug or solid bed and the solid bed melts as it travels down the screw channel. The molten plastic material is collected by the wiping action of the thread into a melt pool. The melt pool gradually increases as the solid bed gradually melts, eventually occupying the entire screw channel.

Molten plastic materials have a very high viscosity and a large amount of heat is generated in the melt pool due to shearing of the melt pool by the rotation of the screw. Thus, the melt pool becomes hotter as it travels down the screw channel and often becomes undesirably hot by the time it reaches the discharge end. Heat transfer from the melt pool to the solid bed is inefficient because of the low thermal conductivity of plastic materials and the limited contact area between the melt pool and the solid bed. Increased heat transfer from the hot, molten plastic material in the melt pool to the cold, solid plastic material in the solid bed is highly desirable in order to reduce the temperature of the molten plastic material discharged from the extruder, increase melting capacity of the extruder and the increase energy efficiency of the extrusion process.

Examples of extruder screws which have come into substantial use for working plastic material and feeding it by extrusion or injection into a die or mold are found in Robert A. Barr Pat. No. 3,698,541, Chan I. Chung, Pat. No. 4,000,884, and more recently an energy efficient extruder screw disclosed in Chung and Barr Pat. No. 4,405,239. These can be broadly described as a screw having a first or main screw thread and a second screw thread which divides the screw channel into a pair of side by side sub-channels of equal width. The diameter of the second thread is sufficiently smaller than the diameter of the barrel such that its clearance to the barrel allows the plastic material to flow over the second thread. The depths of the two side-by-side sub-channels vary continuously and oppositely along the length of the passages so that the combined passage cross-sectional area of the two sub-channels is maintained constant. As one sub-channel becomes shalin in depth with diminishing cross-section area, the other sub-channel becomes deeper correspondingly with enlarging cross-sectional area, so that the plastic material is forced to move from the diminishing sub-channel into the enlarging sub-channel flowing over the second thread. The second thread gives shearing to the plastic material while flowing over it. Such mechanism of moving the plastic material from one sub-channel into the other sub-channel is repeated a number of times.

It is well known in the plastic and rubber industries that such a single screw type of extruder is not a positive displacement device. This means that the restriction to flow downstream of the extruder which creates high pressure at the extruder outlet reduces the pumping rate of the extruder. To obtain higher rates, it is then necessary to run the extruder at higher revolutions per minute. This has the disadvantage of raising the temperature of the extruder, due to the increase shear eventually beyond what is tolerable to the process.

It has been known in the industry that the pressure on the extruder can be reduced to very low levels by using a positive displacement pump between the extruder and process die such as a gear pump. Driven separately, this is able to pump against very severe flow restrictions, where high pressures occur, and yet provide very low pressure at the pump inlet, which is the extruder outlet, enabling the extruder to perform at much higher revolution rates. However, the gear pump drive system and the in-line space it takes up makes it an expensive and troublesome addition and a real problem to add to existing lines.

An object of the present invention is to enable the elimination of these disadvantages by providing a positive displacement pump for producing continuous and positive displacement pumping of fluids, such as plastic material at the discharge end of a single screw type extruder, driven by the latter and located within the extruder barrel, keeping the extruder screw head pressure low while the positive displacement type pump provides the pumping force to overcome the downstream process restrictions to flow.

Other objects, advantages and capabilities of the present invention will become apparent from the following detailed description taken in conjunction with accompanying drawings illustrating a preferred embodiment of the inventions.

DETAILED DESCRIPTION OF A PREFERRED EMBODIMENT

Figure 1:
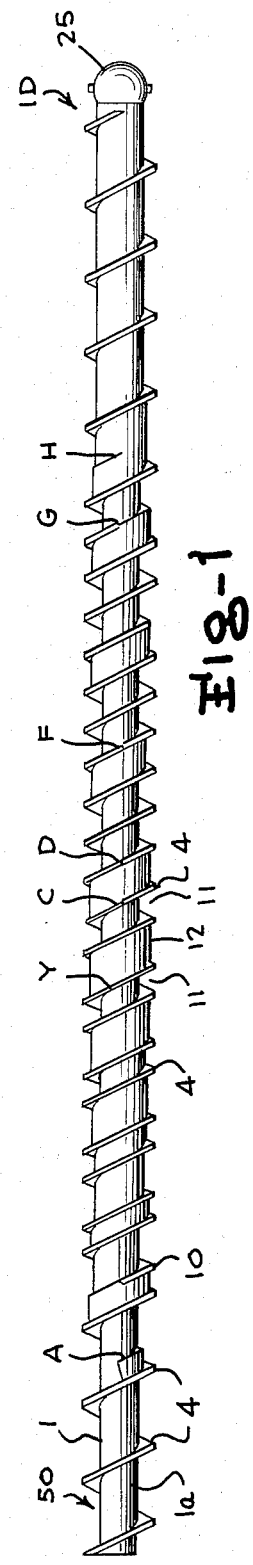
FIG. 1 is a somewhat schematic side elevational view of a conventional single screw extruder section which may becoupled with a positive displacement pump structure to drive. the latter, embodying the present invention.

Referring to the drawings, wherein like reference characters designate corresponding parts throughout the several figures, the single screw extruder and positive displacement pump assembly of the present invention includes a cylindrical barrel 2 of the extruder having a single screw extruder indicated by the reference character 1, which may have the specific construction of a number of extruder screws, such as the extruder screw of the Chung Pat. No. 4,000,884, or the Barr Pat. No. 3,698,541, or the Hsu Pat. No. 3,858,856 or other known commercial extruder screws, but will be described as an assembly involving the extruder screw of U.S. Pat. No. 4,405,239 in the illustrated example. In the assembly, the outlet end portion of the extruder screw is coupled, by a structure later described in detail, to the positive displacement pump structure indicated by the reference character 3 occupying the zone adjacent the outlet end of the cylindrical barrel 2 defined by the extruder device. In the illustrated example, the extruder screw 1 has at least one helical thread 4 with a minimum clearance to the barrel 2 integrally mounted or formed on its core 1a. Thread 4 creates a helical channel 5 radially extending around core 1a of screw 1. The number of turns of thread 4 around core 1a will be called hereinafter, "turns" for brevity. The axial distance between one turn of thread 4 is called "pitch".

A solid plastic material, or a mixture of materials, in pellets, chip, powder or flake form is fed into channel 5 through a hopper and travels down channel 5 by forces exerted by the rotation of screw 1. At A, a portion of channel 5 toward the feed end starts to gradually decrease its depth while the other portion of channel 5 toward the discharge end starts to gradually increase its depth. A second thread 10, which is substantially parallel to thread 4 and has a larger clearance to barrel 2 comparable to but not less than the depth of the front channel portion at B, originates at B rising from the floor of channel 5 and divides channel 5 into two sub-channels, a front channel and a back sub-channel 12.

Second thread 10 converts to become thread 4 at C while thread 4 converts to become second thread 10 at D which is located on thread 4 substantially across C toward the discharge end. The maximum depth of front sub-channel 11 is maintained between C and E which is located at about one-half to preferably one turn toward the discharge end from C. The structural features between B and D are repeated between D and F in substantially the same way, causing a major portion of the plastic material, both solid and molten, collected in front sub-channel 11, to move back into back sub-channel 12 again by the forces exerted by the rotation of screw 1. The movement of the plastic material to the opposite direction of the natural movement requires a high pressure buildup in the delivery sub-channel, and the high pressure can cause undesirable heat buildup and reduction in the pumping capacity of screw 1. The structural features between B and D may be repeated in substantially the same was as many times as desired between F and G. The depths of front sub-channel 11 and back sub-channel 12 and the clearance of second thread 10 may be different from those used between B and D in each repeat cycle in order to achieve the optimum mixing and melting functions of screw 1. Second thread 10 terminates at G, and front sub-channel 11 and back sub-channel 12 merge to become a single channel by gradually changing their depths to a common depth at H which is located about one-half to one turn toward the discharge end from G. Second thread 10 may be present between G and H, terminating at H. The depth of channel 5 usually is kept constant from H to the end of screw 1.

In accordance with the present invention, significant improvement in the pumping rate of the extruder assembly is achieved by providing a positive displacement pump section, indicated generally by the reference character 15, coupled to the discharge end 1D of the extruder screw 1 by a coupling assembly indicated generally by the reference character 16. In the preferred embodiment of the present invention, the positive displacement pump section 10 is formed by what is know as a Moyno pump or Mcineau type pump assembly formed of a Moyno type rounded helical contoured stator and rotor of different pitches embodying the principals of the Moyno gear pumps produced commercially by Robbins & Myers, Inc. of Springfield, Ohio and embodying the principal disclosed in the U.S. patents to R. J. L. Moineau, particularly U.S. Pat. Nos. 1,892,217 and 2,028,407. As described generally in later Robbins & Myers patents disclosing various specific applications of the principles of these earlier Moineau patents, the Moineau type pump assembly in its simplest form generally comprises a hollow external element, usually the stator, here indicated by the reference character 17, and within it an internal element forming the Moyno rotor, generally indicated by the reference character 18, both of them having developed their own rounded helical contours. The helical contour indicated at 17A within the Moyno stator 17 is formed of a plurality of threads, while the outer or exterior surface on the inner Moyno rotor member 18, indicated by the reference character 18A is formed with a number of threads different from and less than the threads 17A of the stator. In commonest form, a cross section of the stator 17A presents a straight sided oval hole at any point, while a cross section of the rotor 18 at any point presents a circular outline which corresponds to the ends of the oval. The pitch of the threads in the rotor is different from that of the pitch of the threads in the stator, for example in the simplest form the rotor thread pitch is one half that of the stator thread pitch. When the Moyno rotor 18 is caused to revolve, its center axis must move in an orbital path, and thus something representing a universal coupling or universally connected link system must be employed since the center axis of rotation of the extruder screw section 1 is a fixed axis extending along the center line of the barrel 2.

Figure 2:
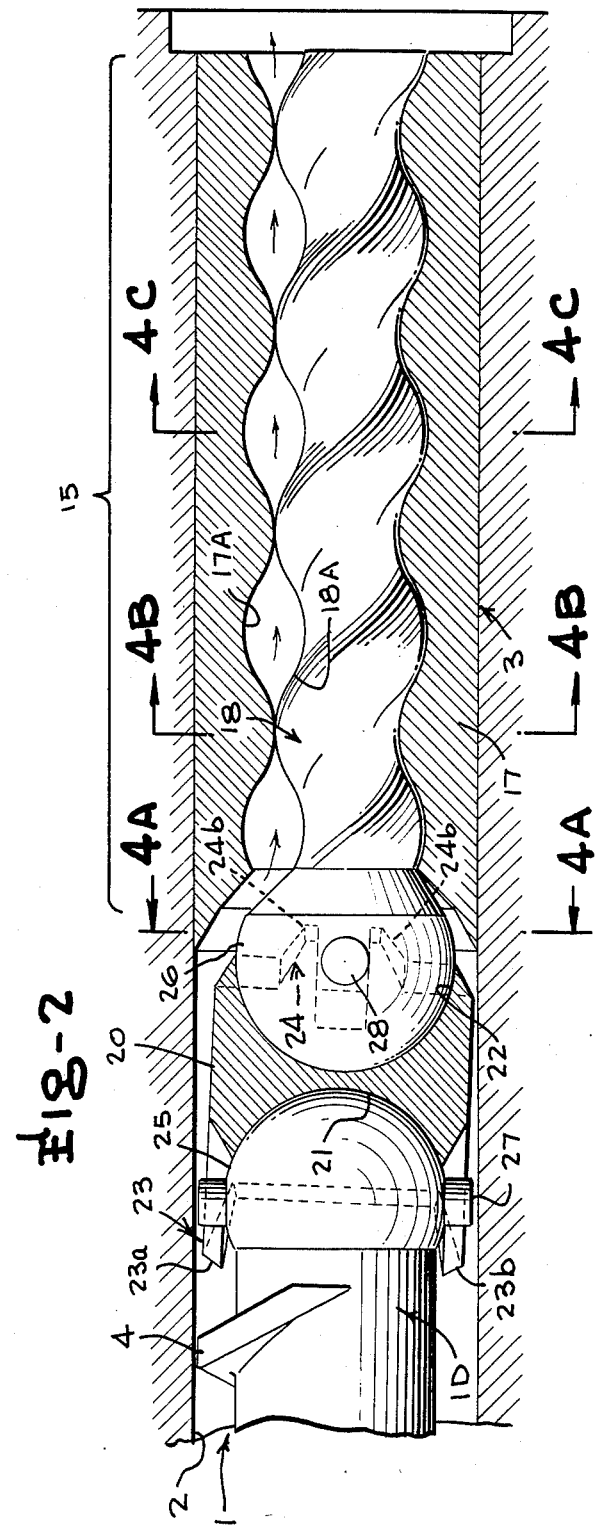
FIG. 2 is a somewhat diagramatic side elevational section view, to larger scale, of the discharge end of the screw section and the positive displacement pump portion and the coupling between the latter and the outlet end of the extruder screw portion.
Figure 3:
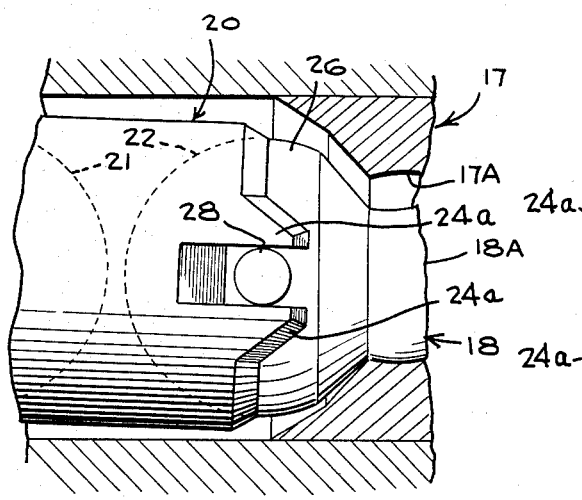
FIG. 3 is a fragmentary top plan view of an end of the coupling assembly.
Figure 4A:
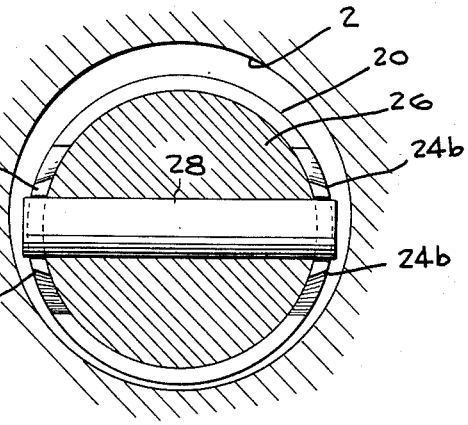
FIGS. 4A, 4B, and 4C are transverse vertical section views taken along the lines 4A—4A , 4B—4B, and 4C—4C of FIG. 3, showing details of the coupling and positive displacement pump construction.
Figure 4B:
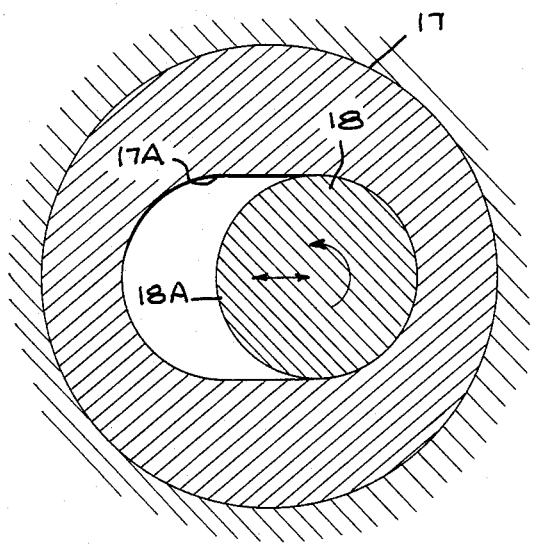
Figure 4C:
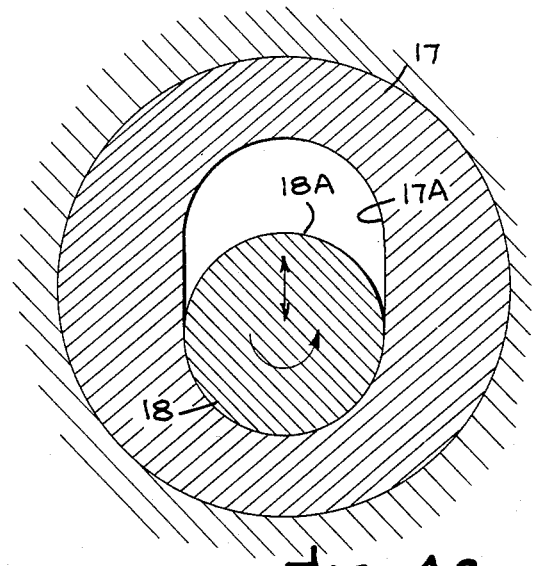

In the illustrated embodiment, the coupling 16 comprises a center body or link member 20 of smaller external diameter than the interior diameter of the barrel 1, providing a pair of oppositely facing coupling cavities each having an approximately hemispheric cavity surface, indicated at 21 and 22, together with clevis-like end portions defined by pin-receiving bifurcated yoke or forked end formations 23a and b and 24a and b, the yoke or forked end formations 23a, 23b being aligned along a transverse axis of the coupling member and the yoke or forked end formations 24a, 24b at the opposite end of the coupling being aligned along another transverse axis which is perpendicular to the transverse axis of the yoke members 23a, 23b and to the longitudinal center axis of the link member 20. These approximately hemispheric cavity formations 21, 22 of the coupling member receive slightly greater than hemispheric head formations 25, 26 fixed to the discharge end of the screw 1 and the upstream end of the Moyno rotor 18, and coupling pins 27, 28 disposed in the recesses defined between the yoke formations 23a, 23b and 24a, 24b respectively and through cylindrical bores in the head formations 25 and 26 extending transversely diametrically through the bores provide rotational coupling for transmitting torque from the discharge end 1D of the extruder screw 1 to the coupling 16 and from the coupling 16 to the Moyno rotor 18. As will be seen from the drawings, FIGS. 2 and 3, sufficient space is provided between the outer surface of the link member 20 of the coupling and between the yoke formations 23, 24 of the coupling and the surface of the barrel or the stator 17 of the positive displacement pump 15 for the passage of the plastic material being extruded from the discharge end of the extruder screw 1 to the inlet end of the helical contour bore 17A of the Moyno stator 17. As will be seen from the drawings and the Moineau patents previously referred to and the Moyno pumps known in the industry, the helical contours of the stator cavity surface 17A and the rotor outer surface 18A are what may be described as helical threads of wide rounded form which define a series of pumping pockets between the two elements of the Moyno pump, which pumping pockets are moved longitudinally through the pump. While the simplified description in some of the above referred to Robbins & Myers patents refer to Moyno pumps wherein the stator is in the form of two threads and the rotor is in the form of a single thread, in practice, the length of the stator and rotor elements and the number of threads is frequently increased to increase the efficiency of the pumping action.

By the above construction, wherein the positive displacement pump section 15 coupled to, driven by, and spaced slightly downstream from the discharge end 1D of the extruder screw section 1, the pressure on the extruder can be reduced to very low levels so that the extruder screw is able to pump against very severe flow restrictions and yet with very low pressure at the extruder outlet (the pump inlet), enabling the extruder to perform at much higher rates per revolution of the screw. Thus the extruder screw head pressure is very low, the positive displacement pump providing the pumping force to overcome the downstream process restrictions to flow.

I claim:

1. A screw extruder assembly for plasticating or melting solid plastic material or the like, comprising an elongated cylindrical barrel having an upstream end and an outlet end, a screw rotatably housed in an upstream portion of said barrel and having a feed end and a discharge end, said screw having a mixing section between the feed end and discharge end thereof comprising at least one pair of substantially parallel, helical, first and second threads integral with the core of said screw, said first thread of the pair originating at the feed end of said screw creating a helical channel and having a minimum clearance to said barrel, said second thread of the pair originating at a location about one-third to two-thirds of the length of said screw from the feed end of said screw by rising from the core of said screw and having a large clearance to said barrel comparable to or greater than the size of the components of said solid plastic material, said second thread of the pair dividing said helical channel created by said first thread into two sub-channels of substantially equal width, one located toward the feed end of said screw from said second thread and the other located toward the discharge end of said screw from said second thread, the depth of the sub-channel located toward the feed end gradually increasing to a maximum comparable to the depth of said helical channel at the feed end of said screw accompanied by gradual decrease of the depth of the other sub-channel to a minimum comparable to or greater than the size of the components of said solid plastic material, a positive displacement Moineau type pump in said barrel located between the discharge end of said screw and said outlet end, said pump having a stator member and a rotor member rotatable in the stator member, the stator member having a hollow cavity therethrough accommodating said rotor member and the stator cavity and rotor exterior having confronting surfaces of developed helical contours providing helical threads of wide rounded form, said confronting surfaces being always in contact with each other at any cross-section defining a series of pumping pockets which progress longitudinally through the pump, the number of threads on said rotor exterior being less than the number of 40 threads in the stator cavity surface, and coupling means interconnecting the discharge end of said screw to said rotor member to drive the latter from said screw to provide reduced pressures at said discharge end and provide pumping force to increase downstream process restrictions to flow.

2. A screw extruder assembly as defined in claim 1, wherein said coupling means is of smaller cross-section than said barrel sized for passage of plastic material from the discharge end of said screw to said pump.

3. A screw extruder assembly as defined in claim 1, wherein said coupling means comprises a generally cylindrical link portion of short axial length and circular cross-section having oppositely facing upstream and downstream end formations of clevis-like configuration each providing a pair of transversely spaced pin-receiving yoke formations, and transversely disposed pin members extending along mutually perpendicular axes through adjacent end portions of said screw and pump into coupled relation with said yoke formations.

4. A screw extruder assembly as defined in claim 2, wherein said coupling means comprises a generally cylindrical link portion of short axial length and circular cross-section having oppositely facing upstream and down stream end formations of clevis-like configuration each providing a pair of transversely spaced pin-receiving yoke formations, and transversely disposed pin members extending along mutually perpendicular axes through adjacent end portions of said screw and pump into coupled relation with said yoke formations.

5. A screw extruder assembly for plasticating or melting solid plastic material or the like, comprising an elongated cylindrical barrel having an upstream end and an outlet end, a screw rotatably housed in an upstream portion of said barrel and having a feed end and a discharge end, said screw having a section between the feed end and discharge end thereof comprising at least one helical thread having plural turns integral with the core of said screw, said thread originating at the feed end of said screw creating a helical channel in the space between successive turns of the thread and having a minimum clearance to said barrel to feed the plastic material along the screw from the feed end to the discharge end, a positive displacement Moineau type pump in said barrel located between the discharge end of said screw and said outlet end, said pump having a stator member and a rotor member rotatable in the stator member, the stator member having a hollow cavity therethrough accommodating said rotor member and the stator cavity and rotor exterior having confronting surfaces of wide rounded form, said confronting surfaces being always in contact with each other at any cross-section defining a series of pumping pockets which progress longitudinally through the pump, the number of threads on said rotor exterior being less than the number of threads in the stator cavity surface, and coupling means interconnecting the discharge end of said screw to said rotor member to drive the latter from said screw to provide reduced pressures at said discharge end and provide pumping force to increase downstream process restrictions to flow.

6. A screw extruder assembly as defined in claim 5, wherein said coupling means is of smaller cross-section than said barrel sized for passage of plastic material from the discharge end of said screw to said pump.

7. A screw extruder assembly as defined in claim 5, wherein said coupling means comprises a generally cylindrical link portion of short axial length and circular cross-section having oppositely facing upstream and downstream end formations of clevis-like configuration each providing a pair of transversely spaced pin-receiving yoke formations, and transversely disposed pin members extending along mutually perpendicular axes through adjacent end portions of said screw and pump into coupled relation with said yoke formations.

8. A screw extruder assembly as defined in claim 6, wherein said coupling means comprises a generally cylindrical link portion of short axial length and circular cross-section having oppositely facing upstream and down stream end formations of clevis-like configuration each providing a pair of transversely spaced pin-receiving yoke formations, and transversely disposed pin members extending along mutually perpendicular axes through adjacent end portions of said screw and pump into coupled relation with said yoke formations.

* * * * *